No. 796,608. PATENTED AUG. 8, 1905.
D. S. SCHUREMAN.
WATER CLOSET.
APPLICATION FILED APR. 17, 1905.

2 SHEETS—SHEET 1.

Witnesses:
H. J. Slagle
E. Behel

Inventor:
David S. Schureman
By A. O. Behel
Atty.

UNITED STATES PATENT OFFICE.

DAVID S. SCHUREMAN, OF ROCKFORD, ILLINOIS.

WATER-CLOSET.

No. 796,608.      Specification of Letters Patent.      Patented Aug. 8, 1905.

Application filed April 17, 1905. Serial No. 255,979.

*To all whom it may concern:*

Be it known that I, DAVID S. SCHUREMAN, a citizen of the United States, residing at Rockford, in the county of Winnebago and State of Illinois, have invented certain new and useful Improvements in Water-Closets, of which the following is a specification.

The object of this invention is to construct a water-closet-flushing device in which two valves are employed, one controlling the admission of water to the tank and the other permitting the water to escape from the tank into the bowl, said valves being separate, and a float permitting the closing of the valve admitting water into the tank.

Figure 1:
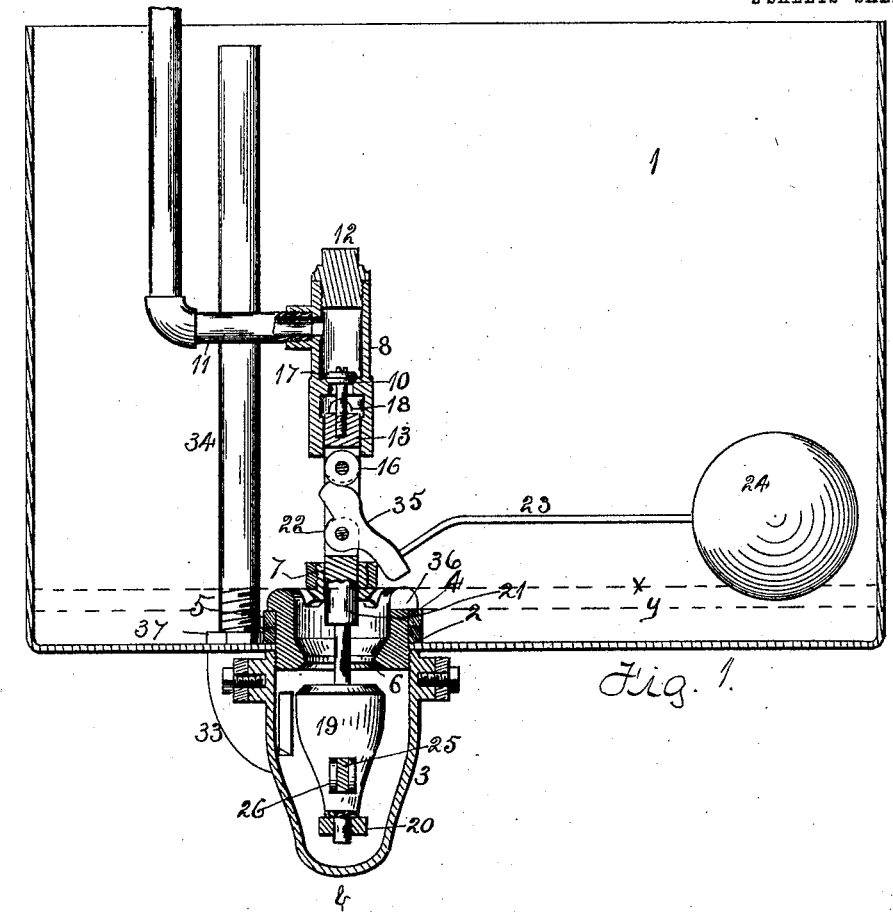
Figure 2:
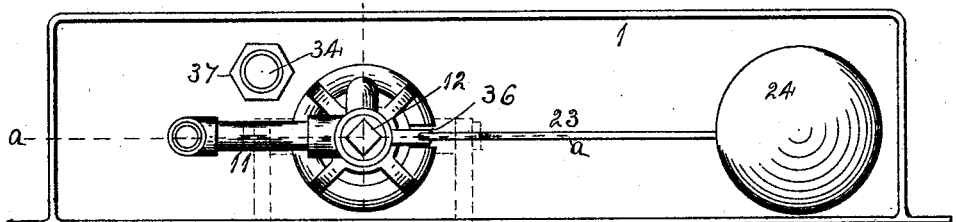
Figure 3:
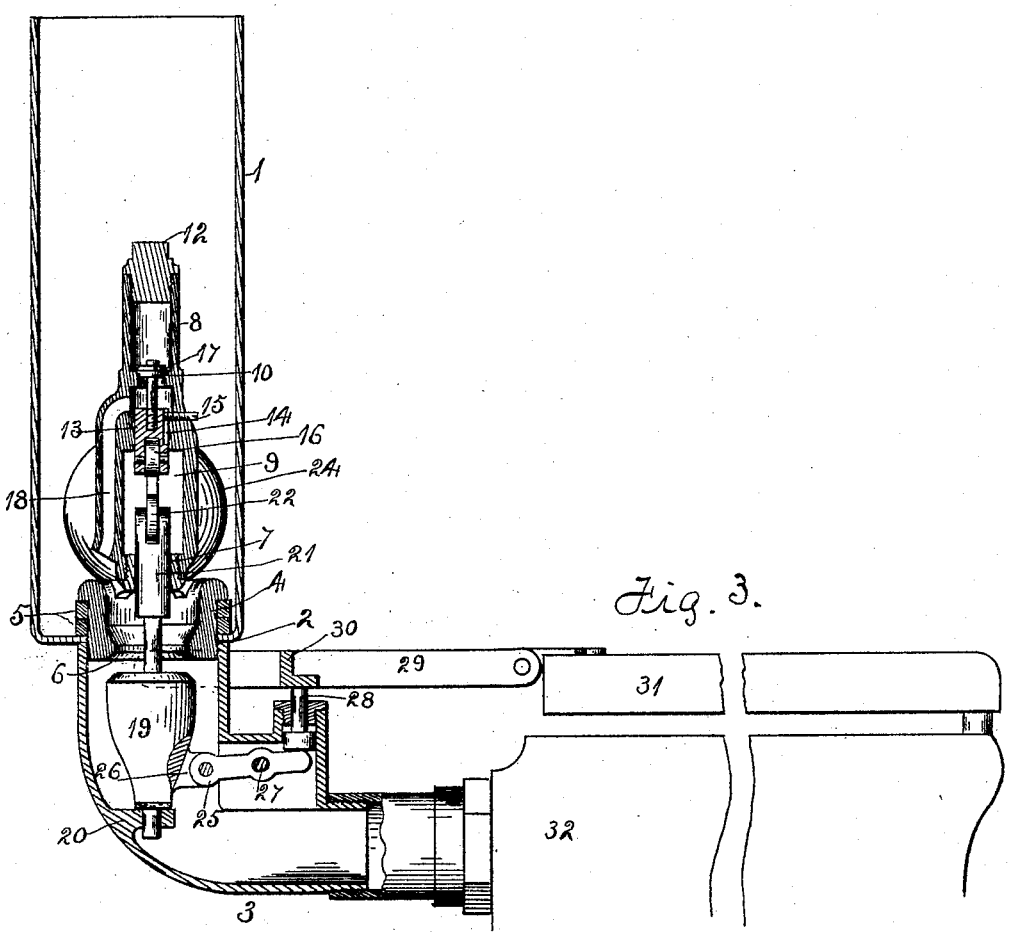

In the accompanying drawings, Figure 1 is a vertical section on dotted line $a$, Fig. 2. Fig. 2 is a plan view. Fig. 3 is a vertical section on dotted line $b\ b$, Fig. 2.

The tank 1 in this instance is rectangular in form and made of metal; but it is evident that the ordinary wooden lead-lined tank can be used. The tank has an opening 2 through its bottom. A lower section 3 has its upper end internally screw-threaded, and its lower end is provided with the discharge-opening. A center section 4 has its lower end externally screw-threaded and passes through the bottom of the tank and turned in connection with the upper end of the lower section 3. The upper end of this center section is in hook form, and beneath the hook and the bottom of the tank are located washers 5. This center section is hollow and has a valve-seat 6 formed in its lower face. An externally-screw-threaded hub 7 is formed integral with the center section. An upper section 8 has a screw-threaded connection with the hub 7 of the center section and has an opening 9. The upper portion of the upper section is tubular and has a cross-bar formed with a valve-seat 10 in its upper face. An inlet-pipe 11 has a communication with the upper portion of the upper section, and a plug 12 closes the upper end of the upper section. A guide 13 is supported by the upper section in a manner to move in a vertical direction and has a side slot 14, within which extends a screw 15, which prevents the guide turning axially. A roller 16 is supported by the lower end of the guide 13. A valve 17 has a screw-threaded connection with the upper end of the guide. A water-escape passage-way 18 has its upper end communicating with the space beneath the valve 17 and the upper end of the guide 13. A valve 19 of considerable weight has its lower end guided by the support 20. From the upper end of this valve extends a guide 21, having its upper end slotted and is guided by the hub 7. The upper slotted end of the guide 21 supports a cam-lever 22 in a pivotal manner. To one end of this cam-lever is connected a rod 23, and to the free end of the rod is connected a float 24. To the valve 19 is pivoted an arm 25 between the ears 26, and this arm has a pivotal connection with the lower section 3 at the point 27. A plunger 28 is guided by the lower section 3 and rests on the free end of the arm 25. To the lower section 3 is pivoted a yoke composed of the side bars 29 and center cross-bar 30. This cross-bar 30 rests on the plunger. The free ends of the side bars of the yoke are pivotally connected to the seat 31, located over the bowl 32. From the side of the lower section 3 extends a chamber 33, which communicates with the lower section.

An overflow-pipe 34 is located within the tank, and its lower end passes through the bottom of the tank and communicates with the chamber 33.

When the parts are in the position shown in the drawings, the closet is not in use.

When the closet is in use, the rear edge of the seat will be depressed vertically, which will depress the plunger and through the arm 25 raise the weighted valve 19 until it comes in contact with the seat 6, thereby closing the opening leading from the tank into the lower section 3. This movement of the weighted valve will, through the cam-lever 22, raise the valve 17 from its seat and permit water to pass from the supply-pipe 11 out through the discharge passage-way 18 into the tank. As the water fills the tank the float 24 will rise, which will move the cam-lever on its pivot, and when the float has fully risen the cam-lever will have moved so that the roller 16 will rest in the recessed portion 35 of the cam-lever, thereby permitting the valve 17 to close and cut off the water-supply. Upon the seat being released the weighted valve 19 will drop and open the passage-way between the tank and lower section 3, thereby permitting the water from the tank to escape into the bowl. As this weighted valve falls the cam-lever will be carried with it, and when the water in the tank has passed to the bowl the float will assume its normal position, which will move the upper end of the cam-lever under the roller, as shown in the drawings, when the operation may be repeated.

It will be seen that the cam-lever forms a connection between the two valves with the float acting as a cantaliver to make the depression of the rear end of the seat act as a direct post from weighted discharge-valve to inlet-valve, said connection being broken by the water filling in the tank raising the float, thereby cutting off the inflow of water.

The main discharge of water from the tank must pass over the upper edge of the hooked upper end of the center section, and a downward flow or afterwash will pass through the notch 36 in the upper portion of the center section.

By the employment of the weighted valve 19 all springs are done away with and no stuffing-boxes are necessary.

When a wooden box is used, the washers 5 are removed and the bottom of the box will fill the space they and the bottom of the iron tank occupy.

The nut 37 on the lower end of the overflow-pipe will be raised to meet the thickness of the wooden box.

A slight vertical movement of the rear edge of the seat will be necessary to operate the mechanism.

The water for the afterflush will occupy the space between the lines $x$ and $y$, Fig. 1.

I claim as my invention—

1. In a water-closet, the combination of a tank, a valve for the water-inlet opening, a valve for the water-discharge opening, a cam-lever movable with the valve for the discharge and capable of opening the inlet-valve, and a float having a connection with the cam-lever.

2. In a water-closet, the combination of a tank, a valve for the water-inlet opening, a valve for the water-discharge opening, means movable with the valve for the discharge-opening for opening the inlet-valve, said means movable independent of the valve for the discharge-opening, thereby permitting the closing of the inlet-valve, and a float having a connection with said means.

3. In a water-closet, the combination of a tank, a valve for the water-inlet opening supporting a roller at its lower end, a valve for the water-discharge opening, a cam-lever movable with the valve for the discharge-opening and a float having a connection with the link, said cam-lever capable of movement in engagement with the roller.

DAVID S. SCHUREMAN.

Witnesses:
A. O. BEHEL,
E. BEHEL.